US012196003B2

(12) United States Patent
Millikin et al.

(10) Patent No.: US 12,196,003 B2
(45) Date of Patent: Jan. 14, 2025

(54) LOCKING CORE

(71) Applicant: RMD INNOVATIONS PTY. LTD., Knoxfield (AU)

(72) Inventors: Philip John Millikin, Junortoun (AU); Geoffrey Howard Ross, Wheelers Hill (AU)

(73) Assignee: RMD INNOVATIONS PTY. LTD., Knoxfield (AU)

( * ) Notice: Subject to any disclaimer, the term of this patent is extended or adjusted under 35 U.S.C. 154(b) by 150 days.

(21) Appl. No.: 18/041,543

(22) PCT Filed: Aug. 13, 2021

(86) PCT No.: PCT/AU2021/050897
§ 371 (c)(1),
(2) Date: Feb. 13, 2023

(87) PCT Pub. No.: WO2022/032354
PCT Pub. Date: Feb. 17, 2022

(65) Prior Publication Data

US 2023/0304324 A1 Sep. 28, 2023

(30) Foreign Application Priority Data

Aug. 14, 2020 (AU) ................................ 2020902893

(51) Int. Cl.
*E05B 47/00* (2006.01)
*E05B 67/22* (2006.01)

(52) U.S. Cl.
CPC .......... *E05B 47/0012* (2013.01); *E05B 67/22* (2013.01); *E05B 2047/0017* (2013.01);
(Continued)

(58) Field of Classification Search
CPC ............. E05B 47/0012; E05B 47/0005; E05B 2047/0017; E05B 2047/0052;
(Continued)

(56) References Cited

U.S. PATENT DOCUMENTS 6,046,558 A * 4/2000 Larson ............... G07C 9/00896 318/281
2006/0283216 A1* 12/2006 Marcelle ............ G07C 9/00182 70/38 A
(Continued)

FOREIGN PATENT DOCUMENTS

CN 208430896 U 1/2019
CN 110107165 A 8/2019
(Continued)

OTHER PUBLICATIONS

International Search Report and Written Opinion for Related Application No. PCT/AU2021/050897 dated Oct. 11, 2021 (10 pages).

*Primary Examiner* — Christine M Mills
*Assistant Examiner* — Yahya Sidky
(74) *Attorney, Agent, or Firm* — Michael Best & Friedrich LLP

(57) ABSTRACT

A system is provided for unlocking a lock comprising: an electronic locking core (1) for insertion in a lock body (18), and a separate power source (40). The locking core (1) comprises: a casing (12) housing an electronic circuit board (20), and a motor (26). The motor (26) is configured to move a locking member (28) located at one end of the casing (12) and externally thereof that transitions a latch of the lock between a locked and an unlocked configuration. A terminal (56) is located at the opposite end of the casing (12) to receive power from the separate power source (40). The power source (40) is housed within a cartridge (42) separate from and connectable to the locking core (1), the cartridge (42) including a co-operating terminal to connect the power
(Continued)

source (40) to the electronic circuit board (20). The motor (26) is activated to move the locking member (28) to unlock the lock when the separate power source (40) is connected to the locking core (1) and the electronic circuit board (20) receives a unique data code from a remote source.

20 Claims, 18 Drawing Sheets

(52) U.S. Cl.
CPC . *E05B 2047/002* (2013.01); *E05B 2047/0024* (2013.01); *E05B 2047/0058* (2013.01); *E05B 2047/0095* (2013.01)

(58) Field of Classification Search
CPC ..... E05B 2047/0057; E05B 2047/0058; E05B 2047/0073; E05B 2047/0094; E05B 2047/0095; E05B 2047/002; E05B 2047/0024; E05B 67/00; E05B 67/06; E05B 67/22
See application file for complete search history.

(56) References Cited

U.S. PATENT DOCUMENTS

| | | | | |
|---|---|---|---|---|
| 2019/0368233 | A1* | 12/2019 | Gengler .............. | E05B 47/0611 |
| 2020/0242868 | A1* | 7/2020 | Gengler ............. | G07C 9/00944 |

FOREIGN PATENT DOCUMENTS

| | | | |
|---|---|---|---|
| CN | 110670979 | A | 1/2020 |
| JP | 2011069152 | A | 4/2011 |

* cited by examiner

LOCKING CORE

FIELD OF THE INVENTION

The present invention relates to a locking core for securing and releasing a lock. The invention also relates to a smart or remotely-controlled locking core for releasing a lock. The invention is also related to a padlock comprising the locking core.

BACKGROUND OF THE INVENTION

Locks of all kinds have been used for centuries for both security and safety. Typically, a lock requires a key to open the lock, where the key is matched to the internal tumblers of the lock. This solution has led to large numbers of lost keys and logistical issues with companies and individuals trying to track, locate and retrieve keys for access.

These logistical issues are sizable for utility companies, like water, electricity and telecommunications. Utility companies may have thousands of secure sites across a country. These sites can be in cities or located in remote countryside locations and may not need to be visited with any frequency. Where a service person requires access to a locked facility they will have to make arrangements to locate and retrieve the correct key for the facility or risk travelling hundreds of miles, only to find the key that they were provided with does not match the lock. Some service providers now have entire departments that deal with nothing other than the tracking and tracing of access keys.

In an attempt to address these key issues, some locks have been designed for electronic-access; however, these key-less locks now rely on power. An issue arises where the lock is only accessed sporadically, in that the power supply within the lock can diminish or run out of power entirely, again leaving a service person unable to access the lock having made the trip to the lock site.

While all locks face the issues described above, it is noted that exterior locks, such as padlocks are more exposed that locks housed within a door, a window frame or a cabinet, and are thus also susceptible to environmental impacts, like wind, rain and dust, potentially rendering these locks unco-operative or inoperative.

The following invention was conceived with these short-comings in mind.

SUMMARY OF THE INVENTION

A first aspect of the invention provides a system for unlocking a lock comprising: an electronic locking core for insertion in a lock body, and a separate power source; wherein the locking core comprises: a casing having an accessible end and a non-accessible end, when inserted into a lock body, an electronic board housed within the casing for receiving electronic data from a remote source, a motor housed within the casing, the electronic circuit board configured to activate on receipt of data containing a unique data code and configured to drive the motor upon receipt of the unique data code, wherein the motor is configured to move a locking member located at the non-accessible end of the casing and externally thereof that transitions a latch of the lock between a locked and an unlocked configuration; and a terminal located at the accessible end of the casing in electrical contact with the internal electronic circuit board to receive power from the separate power source; wherein the separate power source is housed within a cartridge separate from and connectable to the locking core, the cartridge including a co-operating terminal configured to connect with the terminal of the locking core to allow power from the power source to activate the electronic circuit board and motor within the casing; and wherein the motor of the locking core is activated to move the locking member to unlock the lock when the separate power source is connected to the locking core and the electronic circuit board receives the unique data code from the remote source.

An advantage of providing a separate power source that is connectable to the locking core is that it allows the locking core to be powered as and when needed. For example, a service person need only connect the power source to the locking core when the locking core is required to be opened and whilst the power source is not connected to the locking core, the security of the lock is left uncompromised.

The separate power source is preferably external of the lock body when it is connected to the locking core within the lock body.

In some embodiments the power source may be a battery. The power source may be a standard battery size.

The unique data code may be transmitted wirelessly to the locking core from the remote source. The remote source is preferably a cellular device. Alternatively, the unique data code may be transmitted to the locking core via a wired connection from a remote device which is separate from the locking core and preferably separate from the power source.

The unique data code may be created and sent from the remote data source via an app. The remote data source may be triggered to transmit the unique data code by a signal from the electronic circuit board of the locking core, when the remote data source is within the predetermined operational zone and the power cartridge is connected.

The remote data source may be selected from any one of the following: a mobile phone, smart phone, laptop, Mac, PC, tablet and e-watch.

A second aspect of the invention provides an electronic locking core for use in the system of the first aspect, wherein the locking core comprises: a casing adapted for insertion into a body of a lock, an electronic circuit board housed within the casing for receiving electronic data from a remote source, a motor housed within the casing, the electronic circuit board configured to activate on receipt of data containing a unique data code and configured to drive the motor upon receipt of the unique data code; a locking member located at one end of the casing configured for engagement with a latch of the lock, wherein the motor is configured to move the locking member located at the said one end of the casing to transition the latch of the lock between a locked and an unlocked configuration; and a terminal located at the opposite end of the casing in electrical contact with the internal electronic circuit board and configured to receive power from a separate power source.

The motor may have a limiter that limits rotation of the locking member to within an angular range.

According to a third aspect there is provided an electronic locking core comprising: a casing adapted for insertion into a body of a lock; an electronic circuit board housed within the casing for receiving electronic data from a remote source; a motor housed within the casing, the electronic circuit board configured to activate on receipt of data containing a unique data code and configured to drive the motor upon receipt of the unique data code; a locking member located at one end of the casing configured for engagement with a latch of the lock, wherein the motor is configured to move the locking member located at the said one end of the casing to transition the latch of the lock between a locked and an unlocked configuration; and a terminal located in electrical contact with the internal electronic circuit board and configured to receive power from a power source, wherein the motor has a limiter that limits rotation of the locking member to within an angular range.

Suitably, the angular range is between 45° and 315°. More suitably, the angular range is between about 80° and about 280°. Even more suitably, the angular range is between 80° and 100°, and more preferably about 90°.

An advantage to providing a limiter is that motor torque is only applied to the locking member during movement of the locking member, i.e. during unlocking of the lock. This increases the life span of the locking core by minimising stresses that are exerted when torque is applied to a static locking member.

In one embodiment, the limiter may comprise a limit switch that is actuatable via mechanical interaction between a spring biased striker and a surface of the locking member provided with a recess. Preferably, when the recess is rotationally aligned with the striker, the spring biases the striker to enter the recess which actuates the limit switch so as to break electrical contact at the motor, thereby stopping the motor.

In an embodiment, the recess is provided in a peripheral lip on the locking member. Preferably, the surface of the locking member enagagable by the striker is an indented cam surface.

In one embodiment, the motor is arranged to rotate at a rotation speed that is between 10,000 rpm and 20,000 rpm. Suitably, the rotation speed of the motor is no greater than about 10,000 rpm.

The motor may include a gearbox having at least five gears, and more preferably at least seven gears.

The motor may have a gear ratio of at least 380:1, and more preferably about 1000:1.

The cartridge for the power source may be configured to engage with the casing or a casing closer of the locking core.

The cartridge may be threadingly engaged with the casing or casing closer. The cartridge may be snap-fit engaged with the terminal or the casing closer. The cartridge may be push-fit engaged with the terminal or the casing closer. The cartridge may be slidingly engaged with the terminal or the casing closer.

The co-operating terminal of the power source may protrude from the cartridge to be received and engaged with the terminal of the electronic locking core.

The cartridge may have a weatherproof coating that forms a weather-tight seal between the cartridge and the casing of the core.

In some embodiments, the lock may be a padlock. Alternatively, the lock may be a different type of lock, such as a cam lock.

The casing may have a figure-8 cross-section that corresponds to a complementary shaped cavity in the lock body.

The casing is preferably be engaged within the lock body of the padlock or other type of lock to conceal the locking member within the lock body and to expose the terminal.

In some embodiments, movement of the locking member may release or secure the latch of the padlock or other type of lock to transition the latch between the locked and the unlocked configurations. The latch may be a U-shaped latch or shackle.

The casing may be located within the lock body to locate the locking member substantially centrally of the latch or shackle of the lock, in operational engagement with a bolt or bar of the lock. The locking member may comprise a boss that extends from the locking member to engage and drive a rotational bolt or bar of the lock.

In the case of a padlock, movement of the rotational bolt or bar may release a pair of locking balls from locking recesses at a heel and a toe of the shackle, respectively, of the padlock.

The system may include a padlock having a body which is fitted with the electronic locking core.

In a still further aspect, the invention is directed to a method of installing an electronic locking core in a lock comprising a lock body, a locking cylinder, a latch or a bolt, the method comprising the steps of: releasing and removing the locking cylinder from the lock body; installing the electronic locking core into the lock body; aligning a locking member of the electronic locking core with the latch or bolt of the lock; and securing the electronic locking core within the lock body. The lock may be a padlock. The lock may be a cam lock.

In a still further aspect, the invention is directed to a method of using system as previously described, the method comprising the steps of: connecting the separate power source to the locking core to activate the electronic circuit board and motor within the locking core; locating a remote data source in a predetermined operational zone of the electronic locking core; activating the remote data source to transmit a unique data code to the electronic circuit board, wherein the circuit board draws power from the power source and on accepting the unique data code activates the motor to drive the locking member of the locking core to release a latch of the lock.

BRIEF DESCRIPTION OF THE DRAWINGS

Embodiments of the invention are illustrated by way of example, and not by way of limitation, with reference to the accompanying drawings, of which.

Figure 1:
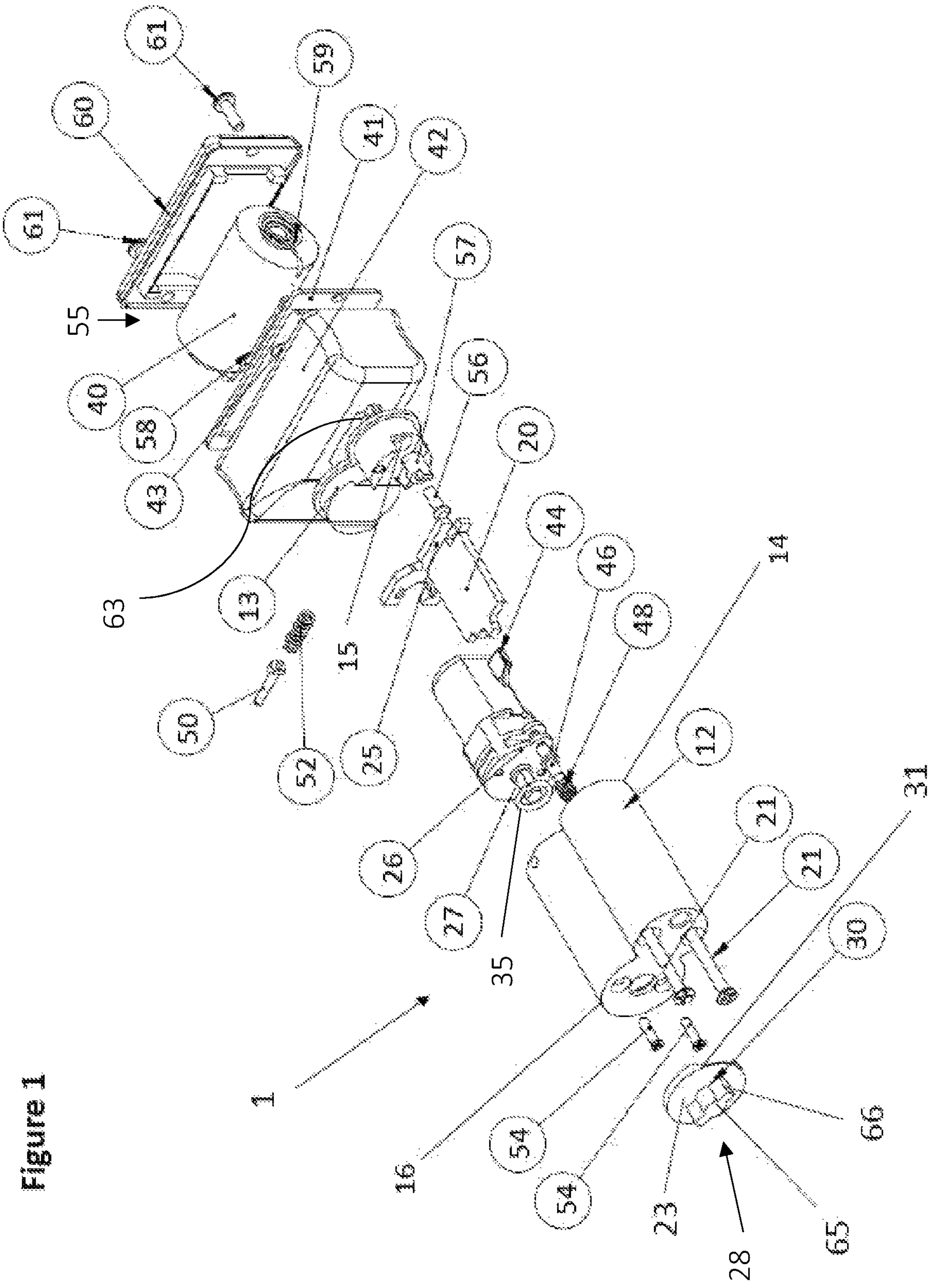
FIG. 1 is an exploded perspective view of a locking core according to an embodiment of the invention, illustrating a demountable power cartridge for powering the locking core.

Embodiments will now be described more fully hereinafter with reference to the accompanying drawings, in which various embodiments, although not the only possible embodiments, of the invention are shown.

DETAILED DESCRIPTION

The invention may be embodied in many different forms and should not be construed as being limited to the embodiments described below. While this description refers primarily to a lock in the form of a padlock, it is understood that the invention can also be applied to other forms of lock where the locking core is substituted for a locking cylinder and as such, can be applied to door locks, window locks, cam locks and the like.

In this specification like features of different embodiments have been identified with like reference numerals. The description includes reference numerals that identify the features described in the figures. However, to maintain clarity of the figures, all of the reference numerals have not been included in each of the figures.

The term lock "cylinder" is understood herein to refer to a cylinder that contains pin tumbler locks. The cylinder can typically be unscrewed by a locksmith to facilitate rekeying, as such the cylinder can be changed without altering the bolt or other hardware of the lock.

In general terms, the invention as illustrated in the FIGS. 1-13 relates to a remotely-controlled locking core (1) for unlocking a lock (2), comprising: a casing (12) having an accessible end (14) and a non-accessible end (16), when inserted into a lock body (18) of the lock, the casing internally housing an electronic circuit board (20) for receiving electronic data from a remote data source (22), the electronic circuit board configured to activate on receipt of data containing a unique data code (24) and configured to drive a motor (26) within the casing upon receipt of the unique data code, wherein a spindle (27) of the motor moves a locking member (28) located at the non-accessible end of the casing and externally thereof that transitions a latch (32) of the lock between a locked and an unlocked configuration; and a terminal (56) located at the accessible end of the casing in electrical contact with the internal electronic circuit board to receive power from a power source (40).

FIG. 1 is an exploded perspective view of both internal and external components of the locking core (1) and a power cartridge (42) providing a detachable power source (40) for the core (1). FIG. 1 illustrates a power source in the form of a battery (40). The battery (40) is a standard CR2 cylinder battery, that can be installed within the power cartridge (42) by removing the cap screws (61) and detaching a cartridge cap (60) thereby providing access to a battery housing cavity (55) within the power cartridge (42). A power source gasket (41) is located between the cartridge (42) and the cap (60) to provide a water-tight seal therebetween and prevent or at least reduce moisture and dirt entering the battery housing cavity (55). A small grub screw (43) is used to hold the gasket (41) in place when the cap (60) is removed for removing and installing the battery (40).

Within the battery housing cavity (55) are two opposed electrical terminals, a positive terminal (58) and a negative terminal (59) for engaging with opposing ends of the battery (40) and supplying electrical power to a cooperating terminal (63) of the power cartridge (42). The co-operating terminal (63) is brought into contact with a terminal, illustrated in FIG. 1 as a positive pin (56) of the locking core (1), to supply power to the locking core (1).

There is no power source within the locking core (1) and as such, the locking core (1) is only activated when the power cartridge (42) is connected to the locking core (1). The power cartridge (42) is a common design that can be engaged to power and one of the locking core (1) as installed in the field. As such, an operator can travel to a lock site with only a single power cartridge (42) in anticipation of engaging with and powering any number of discrete locking cores (1). All unique parts of the locking core (1) are container therein and are configured to operate from any power cartridge (42).

An electronic circuit board (20) is installed within the casing (13) of the locking core (1) and once powered, will respond by exchanging (receiving and transmitting) data signals with a remote data source (22). The remote data source (22) can be a mobile phone, smart phone, computer, laptop, pc, tablet, mac or the like, illustrated schematically in FIG. 3.

A software package is installed onto the remote data source in the form or an application or "app" that generates a unique data code (24) that is recognised by the electronic circuit board (20) to activate the motor and locking member (28) of the core (1). The remote data source (22) can be configured to have a proximity sensor (or GPS), to transmit the unique data code (24) only when within a predetermined radius of the locking core (1). Even once the locking core (1) is brought into proximity with the remote data source (22), the lock will not be activated unless the power cartridge (42) has been engaged.

FIG. 1 also illustrates a casing (12) of the locking core (1) having an opening at a first end (14) that is closed by a casing closer (13). When the locking core (1) is located within a lock body (18) of a lock, the first end (14) remains accessible from outside of the lock. A second, opposing end of the casing (16) is concealed and not accessible once the locking core (1) is installed within a lock body (18).

Figure 2A:
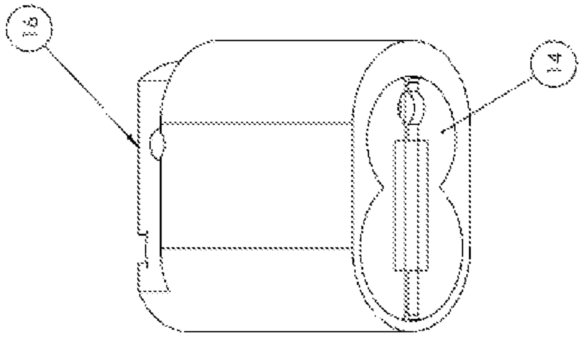
FIG. 2A is a perspective view of the locking core of FIG. 1 installed within a 570-oval lock cylinder (Australian Industry Standard 570-Oval), illustrating an accessible end and a non-accessible, concealed end of the locking core.

FIG. 2A is a perspective view of the locking core of FIG. 1 installed within a 570-oval lock cylinder (Australian Industry Standard 570 Oval) (70), illustrating an accessible end (14) and a non-accessible, concealed end (16) of the locking core (1).

The 570-oval cylinder (70) is widely used across Australia among other countries and is mounted in many doors, windows and cabinets. By releasing the manufacturers pin and tumbler set from the cavity (4) of the lock, the 570-oval lock cylinder (70) can be retrofitted with the locking core (1) to provide remote-access capabilities to the associated lock. The locking member (28) of the locking core (1) is located and secured within the cavity (4) such that the locking member (28) is concealed and inaccessible. Similarly, the terminal (56) is located at the unconcealed, accessible end (16) of the casing (12) and remains accessible to a user to engage the power cartridge (42) permanently or temporarily.

Figure 2B:
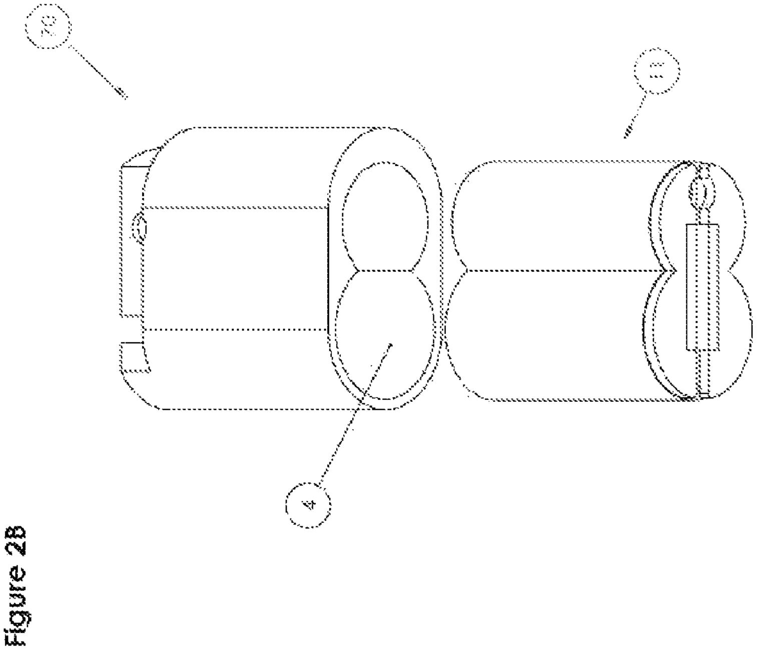
FIG. 2B is a perspective view of the locking core of FIG. 2A removed from the 570-oval lock cylinder.

FIG. 2B is a perspective view of the locking core (1) of FIG. 2A removed from the receiving cavity (4) of the 570-oval lock cylinder (70), illustrating the corresponding geometry of the locking core (1) and the receiving cavity (4).

Figure 3:
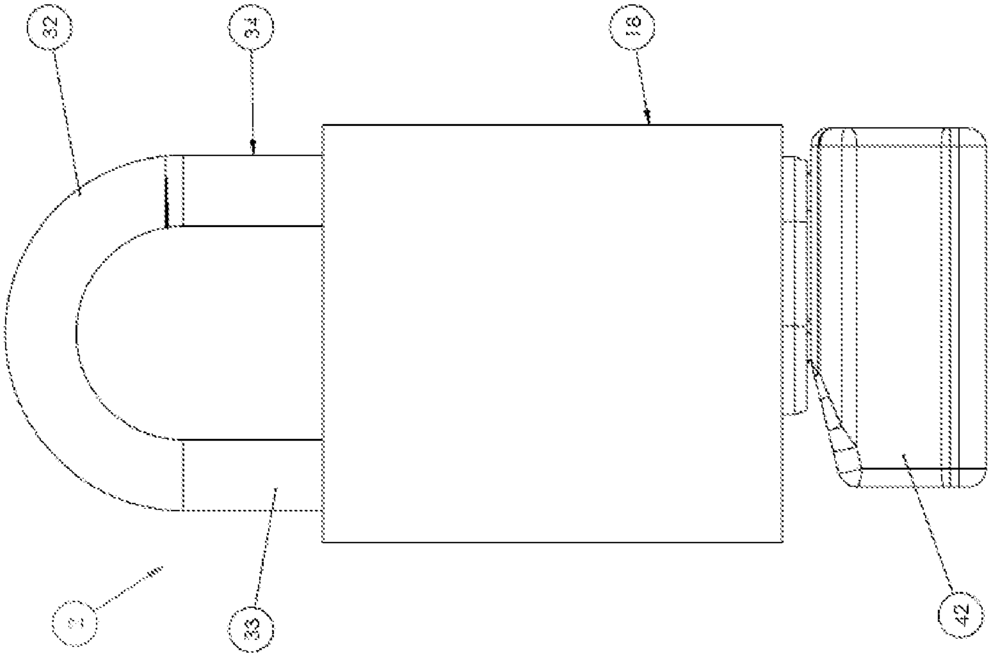
FIG. 3 is a perspective view of a lock configured as a padlock, for housing the locking core within a lock body of the padlock and a power cartridge mounted thereto.

The locking core (1) can also be used with a padlock (2) as illustrated in FIG. 3. The padlock (2) can be sold with a locking core (1) or alternatively can be retrofitted with the locking core (1) as described herein.

The padlock (2) of FIG. 3 has a latch illustrated as a shackle (32) pivotally engaged with the lock body (18) of the padlock (2). The shackle (32) has a heel (33) and a toe (34). The heel (33) remains in contact with the lock body (18) and can rotate therein. The toe (34) of the shackle (32) is held within the lock body (18) when the lock is locked, and is released from the lock body (18) when the lock is unlocked allowing the latch or shackle (32) to be removed from a hasp or eye-bolt of a door or window or cabinet.

Figure 4B:
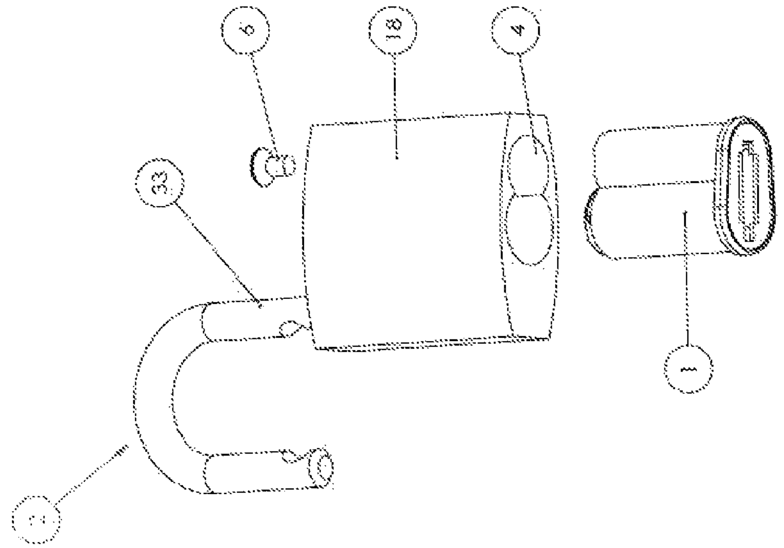
FIG. 4B is a perspective view of the padlock of FIG. 4A, illustrating a core receiving cavity within the lock body and a locking core aligned for installation therein.
Figure 4A:
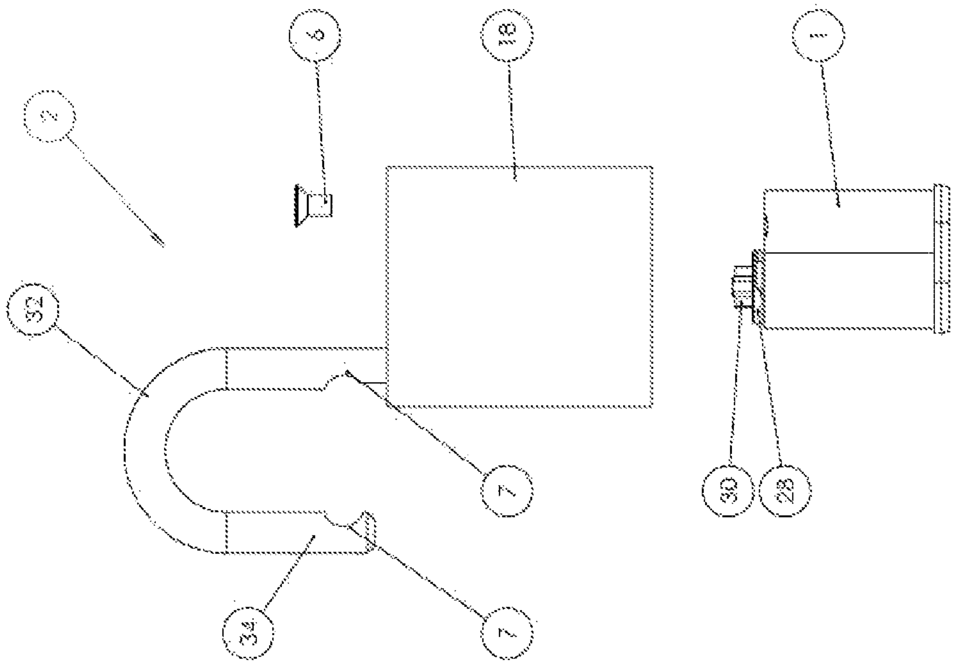
FIG. 4A is a front view of the padlock of FIG. 3, illustrating the shackle pivotally mounted to the lock body, and the locking core and core retaining screw, detached from the lock body.

To be contrasted with FIGS. 2A and 2B illustrating the locking core (1) in conjunction with a standard 570-Oval lock cylinder, FIGS. 4A and 4B illustrate use of the locking core (1) with the padlock (2) of FIG. 3. FIG. 4A is a front view of the padlock of FIG. 3, illustrating the shackle pivotally mounted to the lock body, and the locking core and core retaining screw, detached from the padlock;

The locking core (1) of the padlock (2) can be released and removed from the lock body (18) of the padlock (2) as illustrated in FIGS. 4A and 4B. When the toe (34) is released from the lock body (18) access is gained to a retaining screw (6) (as illustrated in FIGS. 4A and 4B). The retaining screw (6) is located at a distal end of a bore (3) that houses the toe (34) in the locked configuration, thus preventing access to the retaining screw (6) when the toe (34) of the shackle (32) is retained in the bore (3) i.e. the padlock (2) is locked.

A lock core receiving cavity (4) is configured as a figure-eight shaped recess, having two cylindrical cavities sharing a common chord, the first cavity being larger than the second cavity. The casing (12) of the locking core (1) is shaped to snugly fit within the receiving cavity (4) also having a corresponding figure-eight shape such that the locking core (1) can only be inserted in the correct orientation within the cavity (4) and thus ensure engagement between the locking member (28) and the rotational bolt (10) of the padlock (2).

Locking core retaining screw (6) is illustrated as a countersunk screw for inserting into the bore (3) of the lock body (18) and threadingly engaging and securing the locking core (1) within the lock body (18) of the padlock (2).

FIG. 4B is a perspective view of the padlock of FIG. 4A, illustrating the core receiving cavity (4) within the lock body (18) and the locking core (1) aligned for installation therein. Once the screw (6) is released from the bore (3) the locking core (1) easily slides from the receiving cavity (4) allowing for replacement of the locking core (1), or maintenance of the core (1). This mechanism also allows for easy retrofitting of the locking core (1) into a standard padlock, thereby enabling a standard padlock to be retrofitted with a remotely-controlled locking core (1).

Figure 5:
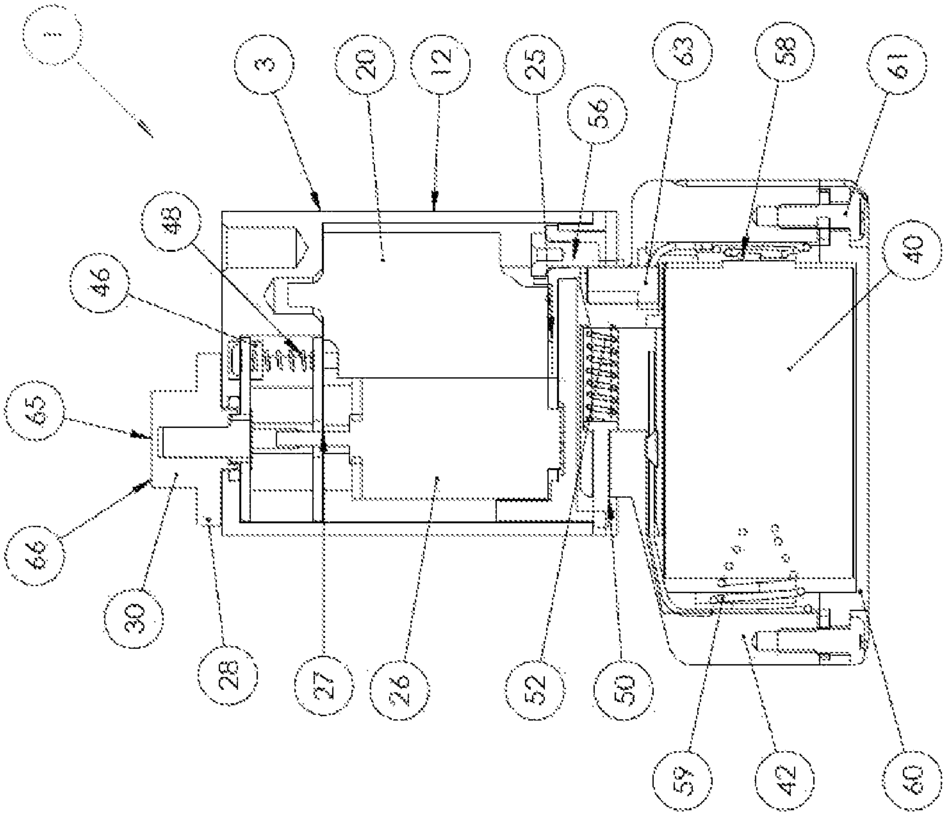
FIG. 5 is a cross-sectional view of the lock body engaged with the power cartridge of FIG. 1, illustrating a terminal of the locking core and a cooperating terminal of the power cartridge in electrical contact.

The casing closer (13) comprises a retainer (50) that is tensioned by a tensioner (52) illustrated as a spring in FIG. 5. Once the cartridge (42) is snap-fitted, or otherwise engaged with the casing closer (13), the retainer (50) holds the cartridge (42) and the locking core (1) together and provides a seal therebetween.

Figure 6:
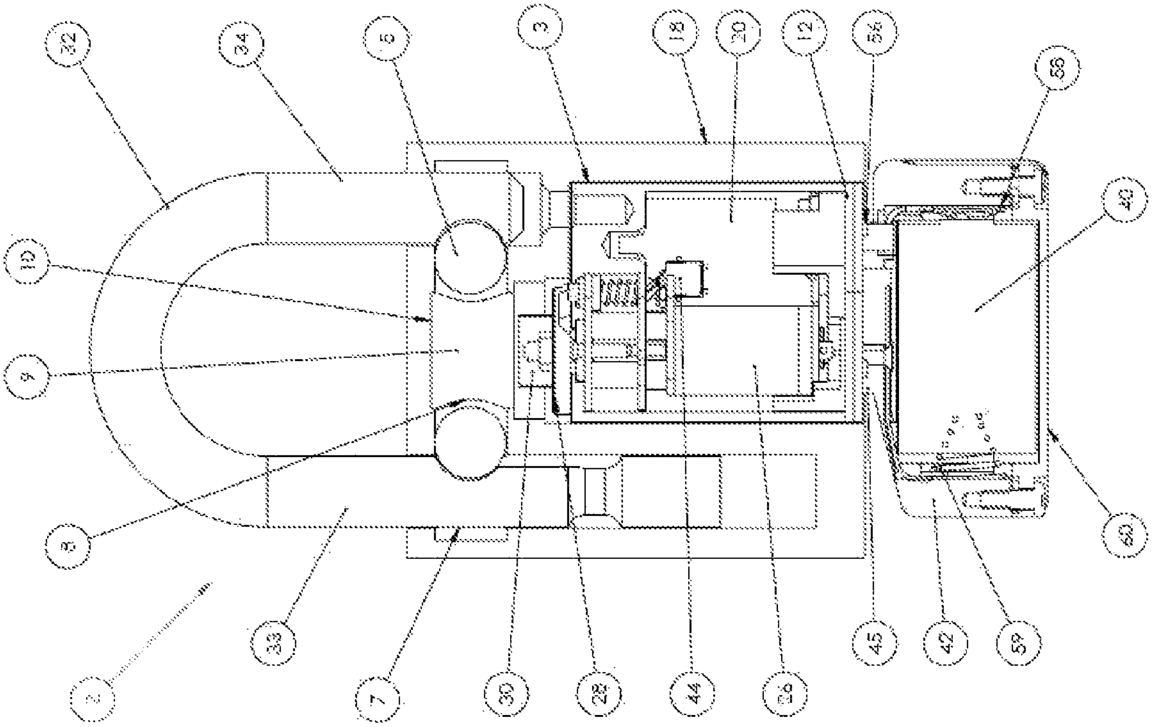
FIG. 6 is a perspective view through the padlock of FIG. 3, illustrating the relationship between locking means of the padlock and a locking member of the locking core.

The operation of the locking core (1) will now be described in relation to the padlock (2) as illustrated in FIG. 6. The padlock (2) comprises an internal locking means comprising a rotational bolt (10) at least one locking ball (5) and at least one locking recess (7).

Within the heel (33) and the toe (34) of the shackle (32) is a pair of locking recesses (7), respectively. The locking recesses (7) are aligned with a pair of spring loaded locking balls (5) which restrict motion of the shackle (32). The balls (5) are forced inwardly towards the centre of the lock body (18) under spring tension and into abutment with the rotational bolt (10) thereby holding the shackle (32) in place.

The rotational bolt (10) includes a pair of corresponding recesses (8) for receiving the locking balls (5) as the rotational bolt (10) is turned by a locking member (28) of the locking core (1). When the balls (5) are aligned and received within the corresponding recesses (8) of the rotational bolt (10), the engagements between the balls (5) and the locking recesses (7) are broken allowing the shackle (32) to move and the shackle toe (34) to be withdrawn from the lock body (18) of the padlock (2).

Going back to FIG. 1, the internal components of the casing (12) are illustrated in an exploded view. When the casing closer (13) is in place only the locking member (28) is exposed from the exterior of the core (1) at the concealed second end (16) and the terminal (56) at the first, accessible end (14) of the core (1).

The terminal (56) is illustrated in FIG. 1 as a pin seated in an insulating holder (57). The terminal (56) is accessible through an access opening (15) in the casing closer (13) to physically contact the co-operating terminal (63) of the power cartridge (42).

The terminal (56) passes electrical power from the battery (40) within the cartridge (42) to a motor printed circuit board (25) which once powered, activates a motor (26) within the casing (12).

The motor (26) is held in place by at least one retaining screw (54) such that the spindle (27) of the motor is rotated by the motor. An "O"-ring seal 35 is provided between an end of the motor housing and the casing (12) where the spindle (27) extends through an aperture in the end of the casing. The spindle (27) is received by the locking member (28) which sits externally of the casing (12). The locking member (28) includes a drive lug in the form of a protruding boss (30). The boss (30) has a central body (65) and two opposing elongate arms (66).

Figure 1A:
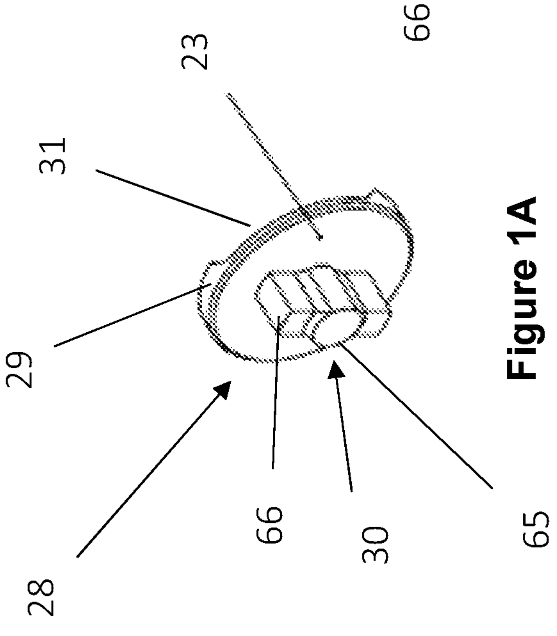
FIG. 1A-1C are various views of a locking member of the locking core shown in FIG. 1, including: a perspective view (FIG. 1A); a front view (FIG. 1B); and a rear view (FIG. 1C)
Figure 1B:
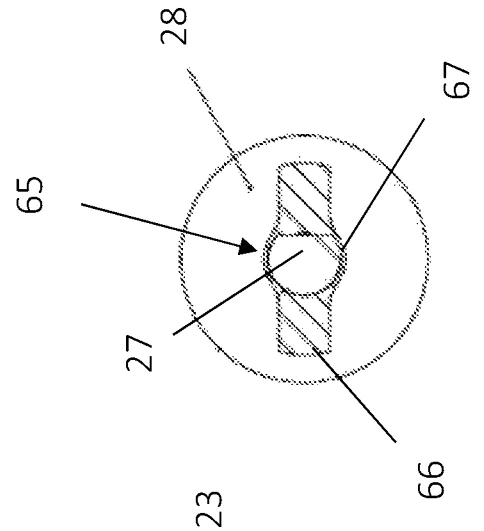

As shown in FIG. 1B, an end of the spindle (27) of the motor is received within a central bore (67) in the locking member disc (28) and boss (30). At least the end of the spindle (27) has at least one flat surface for engagement with a flat surface within the bore (67). The central body (65) and the arms (66) of the boss (30) are received by a cavity (9) of the rotational bolt (10) such that movement of the spindle (27) turns the locking member (28) and the resulting rotational movement of the locking member (28) rotates the boss (30) and the engaged rotational bolt (10) to release the shackle (32) of the padlock (2).

Figure 1C:
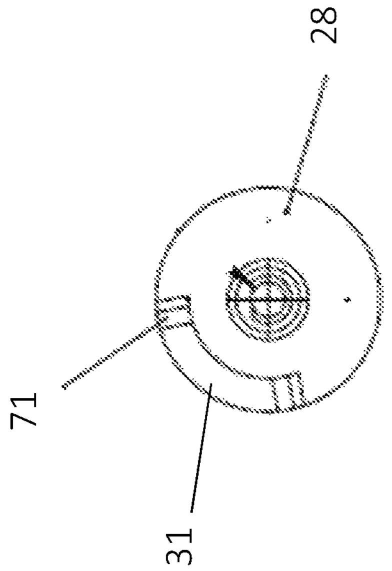

The locking member (28) is disc-shaped with the boss (30) on a first surface (23) facing away from the core (1) and has a peripheral lip (29) extending from the first surface (23) towards the core (1). The peripheral lip (29) has a recess (31) therein, as is best shown in FIG. 1C. The recess (31) extends through approximately 90° of the circumference of the disc-shaped locking member (28). Sloping surfaces (71) are provided at the ends of the recess (31) where the recess transitions into the peripheral lip (29) to provide an indented cam surface on the locking member (28).

The electrical circuit board (20) is mounted to the casing by at least one retaining screw (21) that extends through the core (1) and holds the electrical circuit board therein.

The motor (26) further includes a limiter for limiting rotation of the locking member (28) and boss (30).

The limiter is an electromechanical device that comprises a limit switch (44), and an actuator in the form of spring-loaded striker pin (46) mechanically linked to a set of contacts of the limit switch (44). The striker pin (46) is biased by a limit switch spring (48) in a direction towards the locking member (28). When the lip (29) of the locking member (28) comes into contact with the striker pin (46), the striker pin (46) engages the contacts of the limit switch (44) contacts to make the electrical connection that drives movement of the locking member (28). The limit switch spring (48) holds tension on the striker pin (46) urging the striker pin (46) to protrude from the concealed end (16) of the casing (12) to await contact with the recess (31) of the lip (29) of the locking member (28).

When the motor (26) rotates the spindle (27) the locking member (28) is rotated. As the locking member (28) rotates, the boss (30) rotates the rotational bolt (10) to release the shackle (32). Also, as the locking member (28) is rotated, the recess (31) in the peripheral lip (29) is brought into alignment with the striker (46). The limit switch spring (48) pushes the striker into the recess (31) when aligned, breaking the contact with the limit switch arm (47) and thereby the electrical contact and stopping the motor (26) and rotation of the spindle (27). The limit switch (44) thereby limits the rotation of the locking member (28) and thus the rotational bolt (10) of the locking means of the padlock (2). The limit switch limits rotation of the locking member to within an angular range defined by the arc of the recess (31). When the arc of the recess is approximately 90°, the angular range is about 270°.

The limiter and the indented cam surface on the locking member (28) provided by the peripheral lip (29), the recess (31) and the sloping surfaces (71) at the transition points between the lip (29) and the recess (31) assist in providing a smoother transition for starting and stopping the motor, helping to prolong the lifetime of the motor.

The casing closer (13) seals the casing (12) leaving only the access opening (15) accessible from accessible end (14) to allow for electrical contact between the terminal (56) and the cooperating terminal (63). Shown in FIG. 5, the terminal (56) is a metal pin seated in an insulator (57) and contacting the cooperating terminal (63) of the power cartridge (42) when installed. A rubber weather shield is provided around the cartridge (42) to protect the battery (40) and waterproof the cartridge (42).

Figure 7:
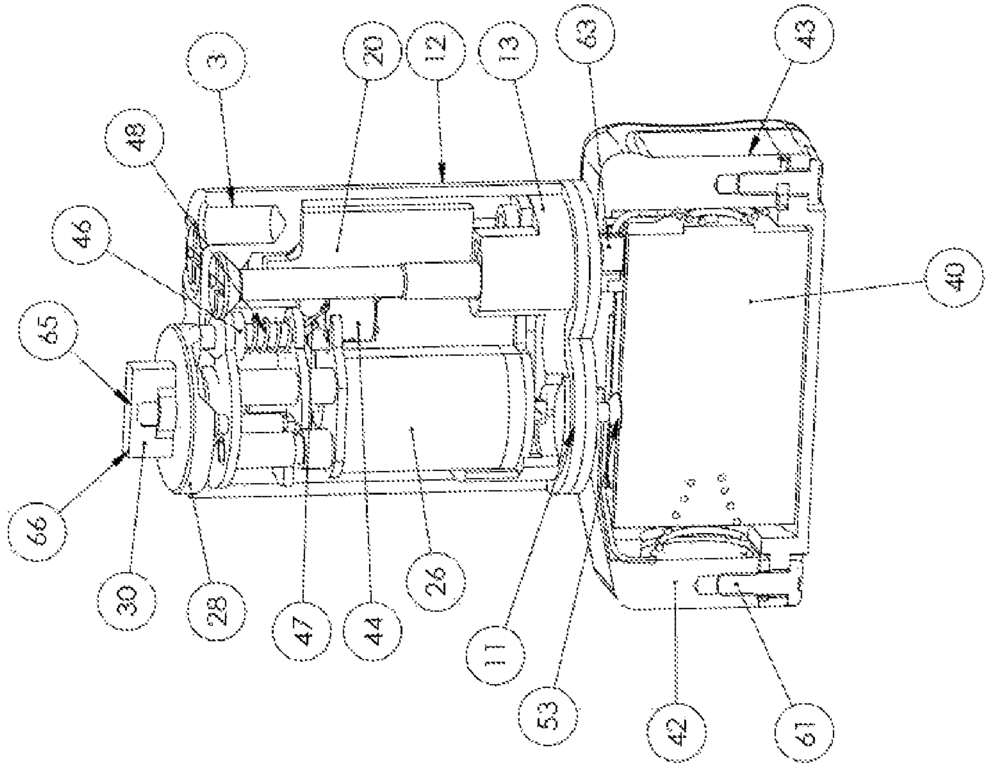
FIG. 7 is a perspective view of the locking core electrically engaged with the power cartridge independently of the lock body.

Shown in more detail in FIG. 7, the padlock (2) and lock body (18) are removed, illustrating the engagement between the cartridge (42) and the locking core (1). A cartridge retaining screw (53) can be employed to hold the cartridge (42) in fixed connection with the locking core (1) if so desired, as illustrated in FIG. 8A.

The casing (12) includes a release hole (11) for allow tool access to release the casing closer (13) from the casing (12).

Figure 8B:
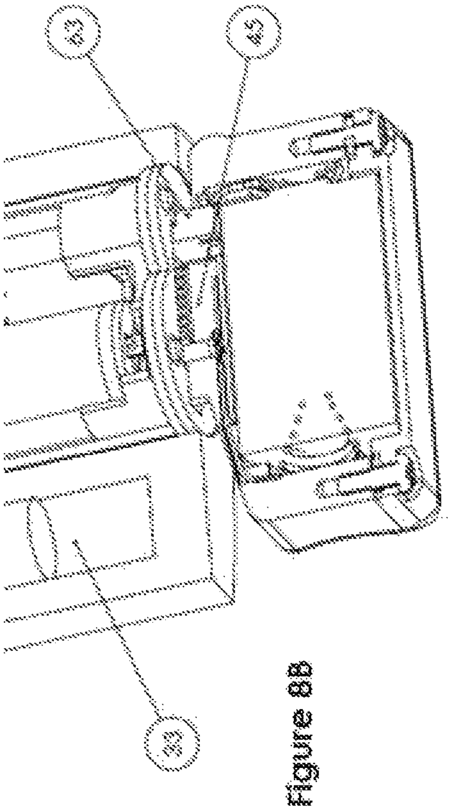
FIG. 8B is a perspective view of an electrical connection between the terminal of the locking core and the cooperating terminal of the power cartridge with the lock body and cartridge shown in ghost outline.
Figure 8A:
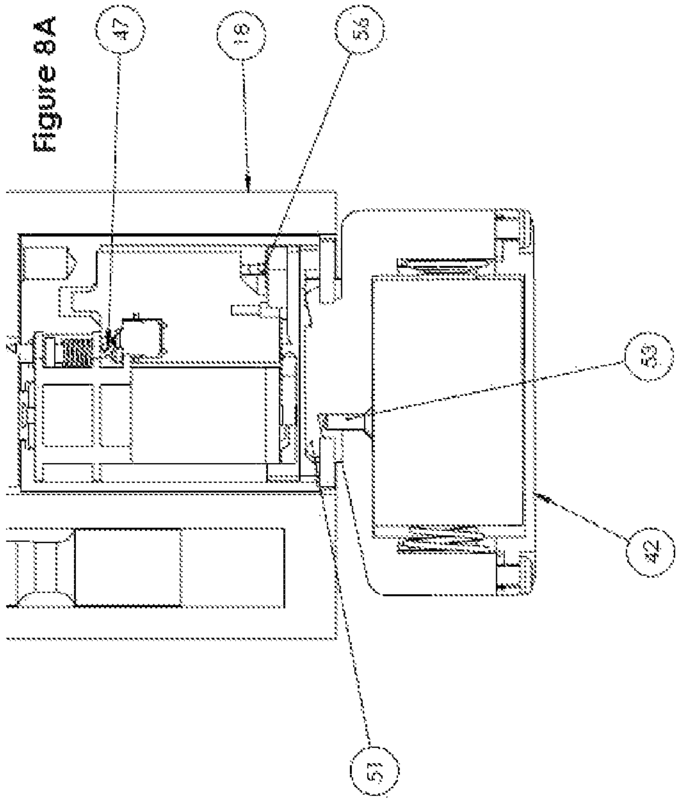
FIG. 8A is a cross-sectional view of the power cartridge illustrating engagement means between the cartridge and the casing of the locking core to provide a watertight seal therebetween.

The power cartridge (42) also comprises a blade (45) shown in FIG. 8B, that seats with the casing closer (13) to hold the cartridge (42) in place and maintain connection between the terminal (56) and the cooperating terminal (63). The entire cartridge (42) is coated for protection from the environment such that only the cooperating terminal (63) is exposed for engagement with the terminal (56).

Figure 9B:
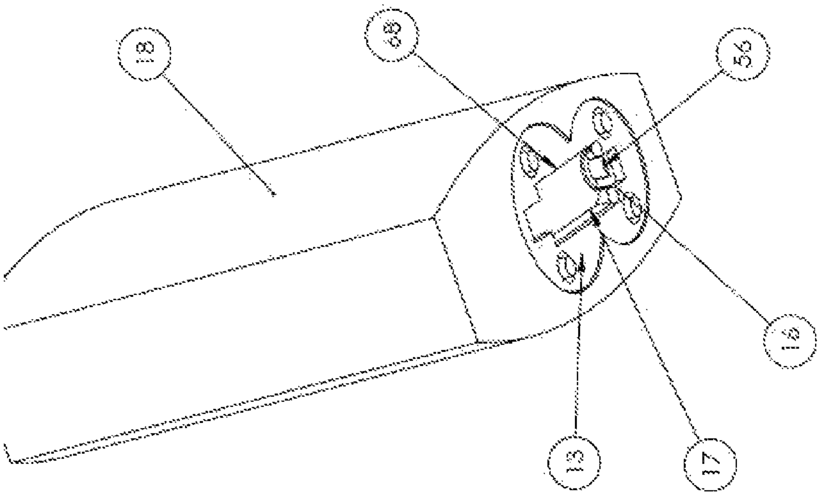
FIG. 9B is a right-side perspective view of the accessible end of the casing of the locking core when fitted within the lock body, illustrating the bespoke recess exposing the terminal within the lock body.
Figure 9A:
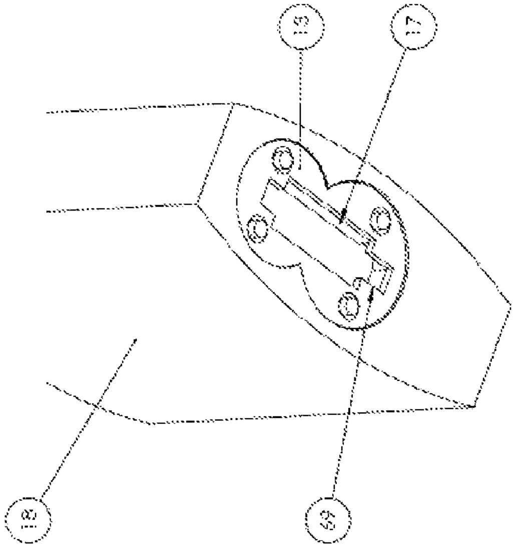
FIG. 9A is left-side perspective view of an accessible end of the casing of the locking core when fitted within the lock body, illustrating a bespoke recess for receiving and securing the cartridge thereto.

Illustrated from two views in FIGS. 9A and 9B is a bespoke slot (17) in an exterior of the casing closer (13) for engaging and retaining the cartridge (42). The slot (17) has a rectangular central portion (68) and a pair of keyed ends (69).

The central slot portion (68) receives the blade (45) of the cartridge (42), while the keyed end portions (69) provide engagement to a mounting lip (51) and a locking lip (49) of the cartridge (42). The cross-sectional view of FIG. 8A, illustrated each of the mounting lip (51) and locking lip (49) engaged and secured to the receiving slot (17), with the cartridge retaining screw (53) holding the locking core (1) to the cartridge (42).

Figure 10A:
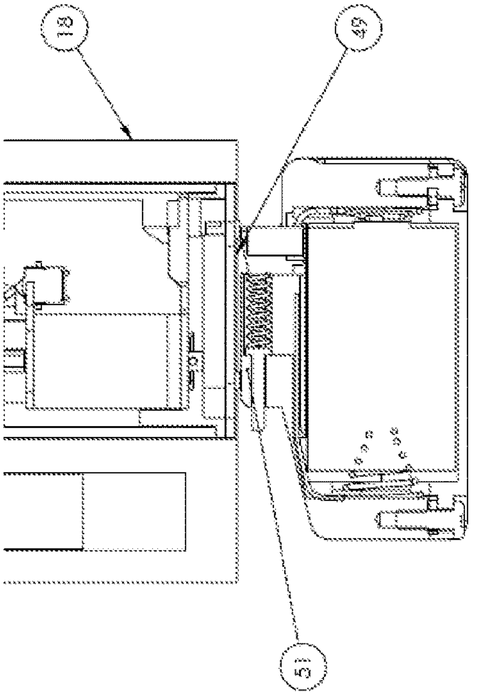
FIGS. 10A-10D are cross-sectional views of the power cartridge: disengaged from a casing of the locking core (FIG. 10A); tilted in anticipation of engagement with the casing (FIG. 1013); partially engaged with the casing (FIG. 10C); and fully engaged with the casing (FIG. 10D)
Figure 10B:
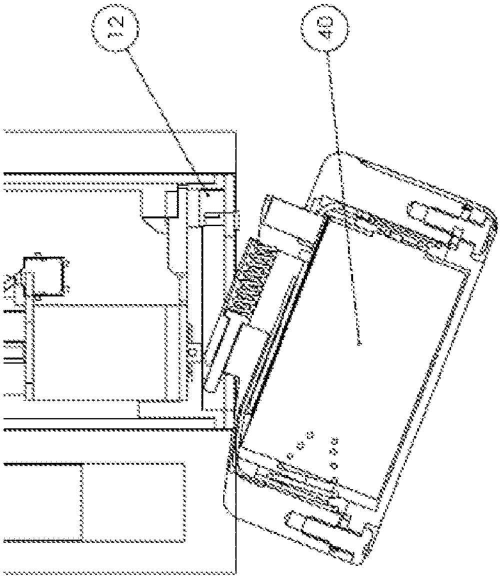
Figure 10C:
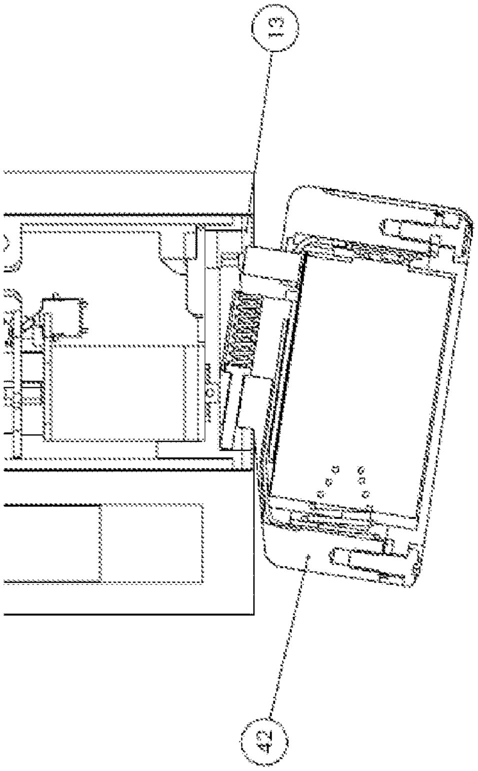

FIGS. 10A-10D illustrated steps for providing power to the locking core (1) by connecting the power cartridge (42). First, as shown in FIG. 1A, the cartridge (42) is located in proximity to the locking core (1) and the blade (45) is aligned with the receiving slot (17). Secondly, the cartridge (42) is tilted to bring mounting lip (51) into one of the keyed ends (69) of the slot distal to the terminal (56) (FIG. 10B). The mounting lip (51) is slid into the keyed end (69) as the cooperating terminal (63) is urged towards the second keyed end (69) proximate the terminal (56), FIG. 10C.

Figure 10D:
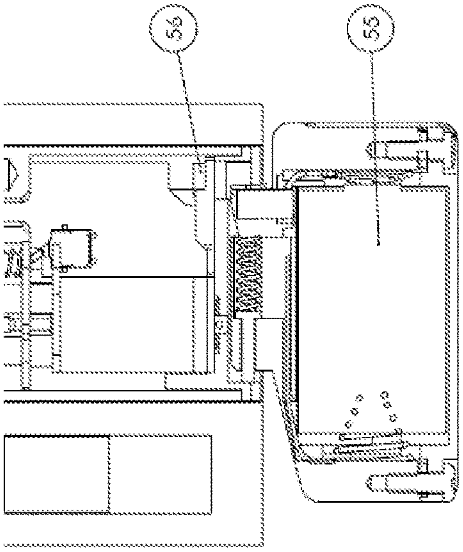

Finally, as the terminal (56) and cooperating terminal (63) are aligned, the blade (45) surrounded by the locking lip (49) is pushed towards the casing closer (13) to snap-fit the locking lip (49) thereto (FIG. 10D). Once engaged, the mounting lip (51) and locking lip (49) provide a tight seal between the cartridge (42) and the locking core (1) and also hold the terminal (56) in electrical connection with the cooperating terminal (63).

Figure 11:
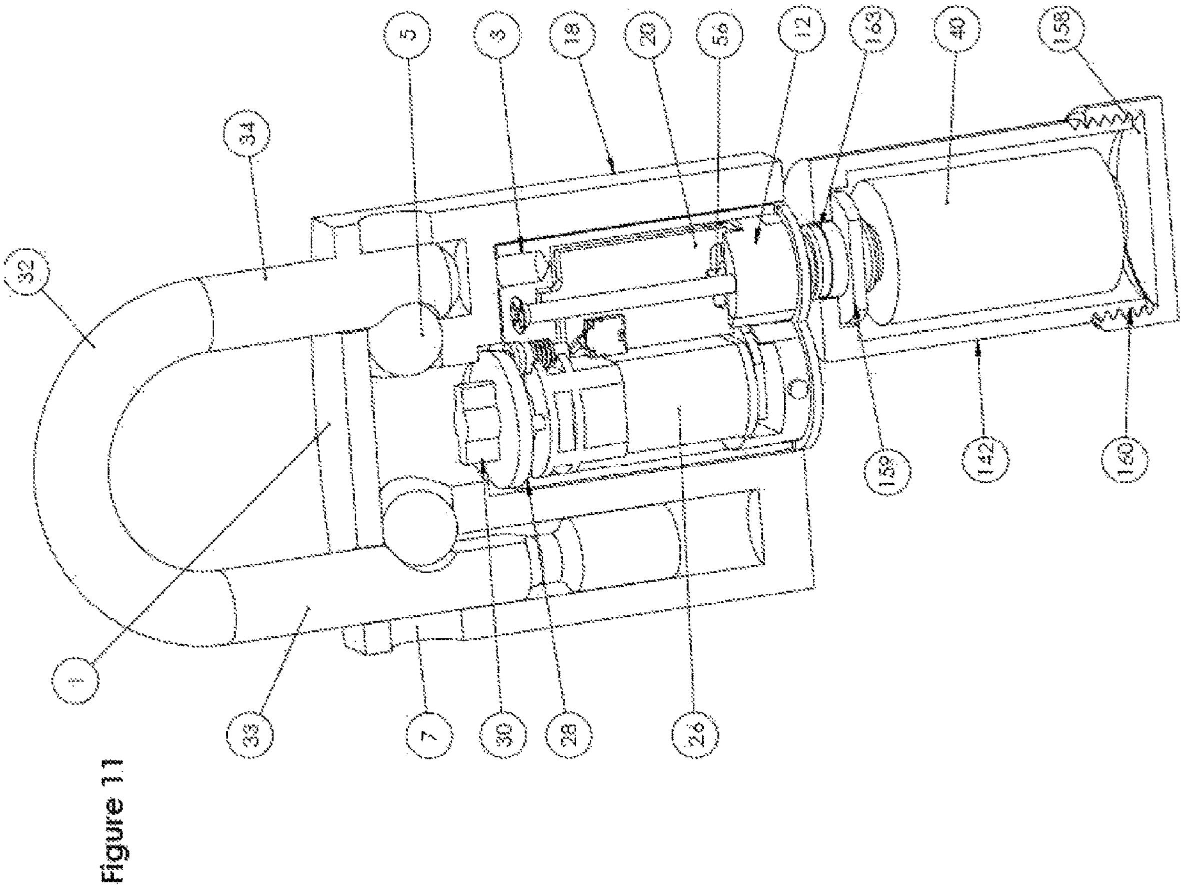
FIG. 11 is a perspective view of a lock configured as a padlock, for housing the locking core within a lock body of the lock and an alternative embodiment of a power cartridge mounted thereto.

FIG. 11 illustrated an alternative embodiment of a power cartridge (142) housing the battery (40). All features of the locking core (1) as described above are identical save for the casing closer (113) which is configured to receive and retain the power cartridge (142). The casing (12) include a release hole (11) for allow tool access to release the casing closer (113) from the casing (12).

The power cartridge (142) has a cartridge cap (160) threadingly engaged to the cartridge (142). The cap (160) is unscrewed to release and replace the battery (40) which is a standard battery type, shown in FIG. 11 as a CR2—cylinder battery.

A first terminal (158) is mounted in the cap (160) and as the cap (160) is screwed via thread (162) onto the cartridge (142) the battery (40) is tensioned against the second terminal (159) of the cartridge (142).

The cartridge (142) has a bespoke knuckle thread (164) that cooperates with the casing closer (113) to engage the cartridge (142). Even once the locking core (1) is brought into proximity with the remote data source (22), the lock will not be activated unless the power cartridge (142) has been engaged.

In the system of the present invention, the shackle is automatically released and as such provides a contactless entry application.

Figure 3A:
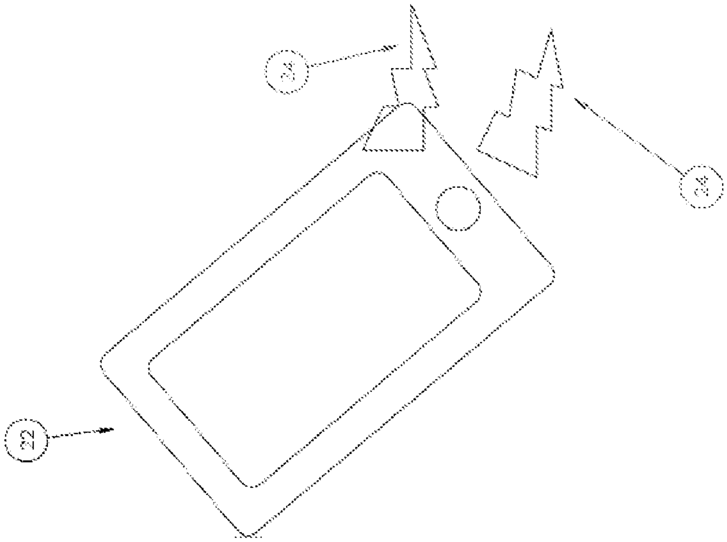
FIG. 3A is a schematic illustration of a mobile data device for activating the remotely-controlled locking core within the lock body of the padlock of FIG. 2.

In some embodiments, the locking core (1) is configured to auto-release. Such that when the power cartridge (42, 142) is connected to locking core (1), a signal is sent from the electronic circuit board (20) to the remote data source (22). When the remote data source (22) is within a predetermined range of the locking core (1) the unique data code (24) is then automatically sent to the powered locking core (1), releasing the shackle (32) automatically without any further contact with the mobile phone or padlock. Users can thus leave the remote data source (22) in a bag or pocket avoiding the need to handle the remote data source (22) once within the predetermined range (see FIG. 3A).

The knuckle thread (164) is a wide-pitched-and rounded-tip-thread, selected to avoid dirt and grit interfering with the screw in battery connection. Once connected the power cartridge (142) powers-up the motor (26) to drive the boss (30) and auto-release the toe (34) of the shackle (32) from the lock body (18) via the rotational bolt (10).

Figure 12:
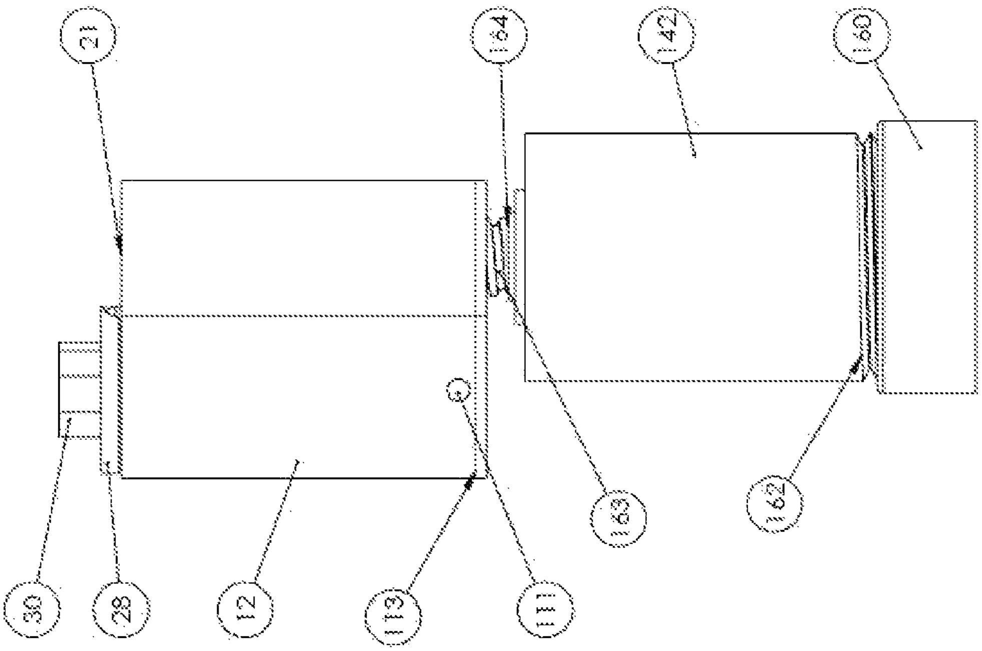
FIG. 12 is an enlarged view of the locking core of FIG. 1 engaged with the power cartridge of FIG. 11, illustrating the electrical connection therebetween and the locking member for locking and unlocking the lock.

FIG. 12 illustrates the locking core (1) and cartridge (142) in isolation of the lock body (18). The terminal (56) of the locking core (1) is not visible as it is configured not to protrude from the lock body (18) once installed. This prevents unwanted damage or breakage of the terminal (56) if the lock body (18) of locking core (1) is accidentally dropped or knocked.

Figure 13:
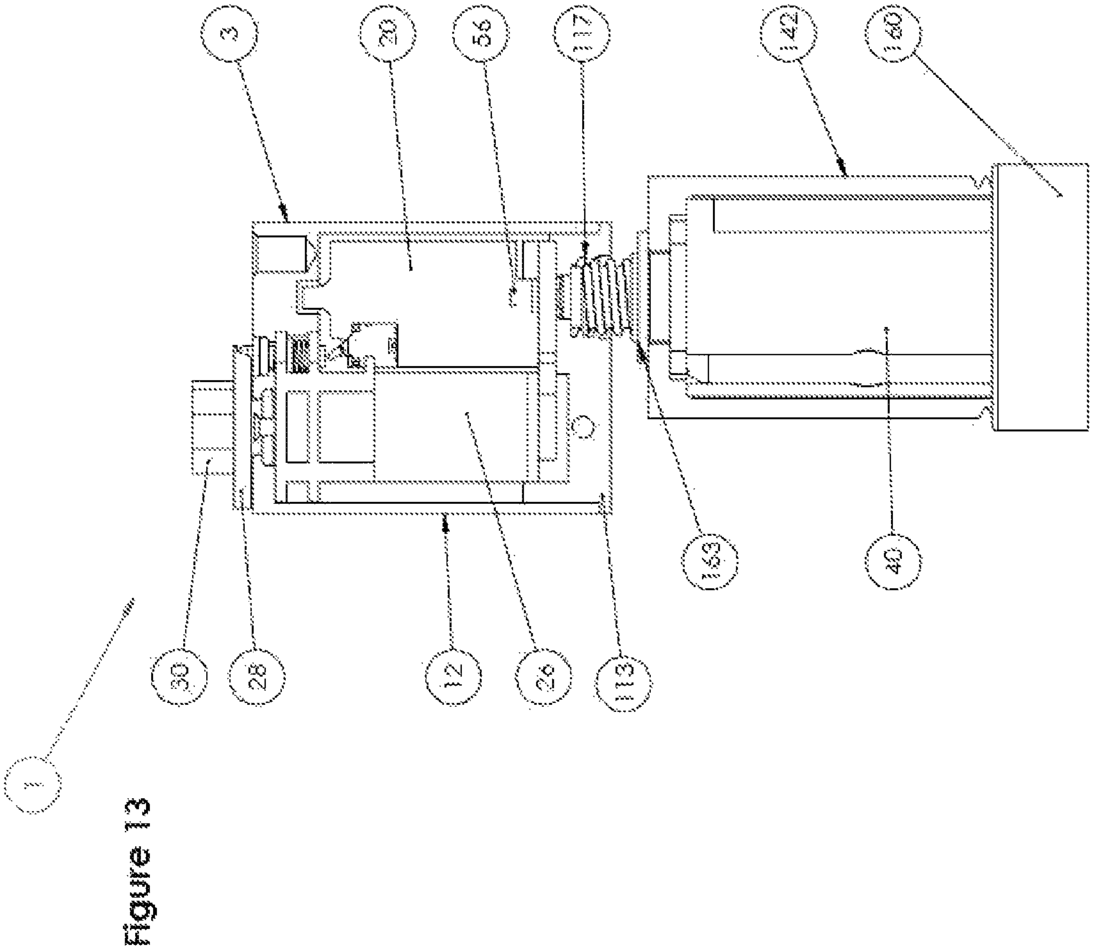
FIG. 13 is a perspective view of FIG. 12, illustrating the power cartridge and casing of the locking core in ghost view to show a motor and electronic circuit board activated by connection of the power source within a battery of the power cartridge.
Figure 14:
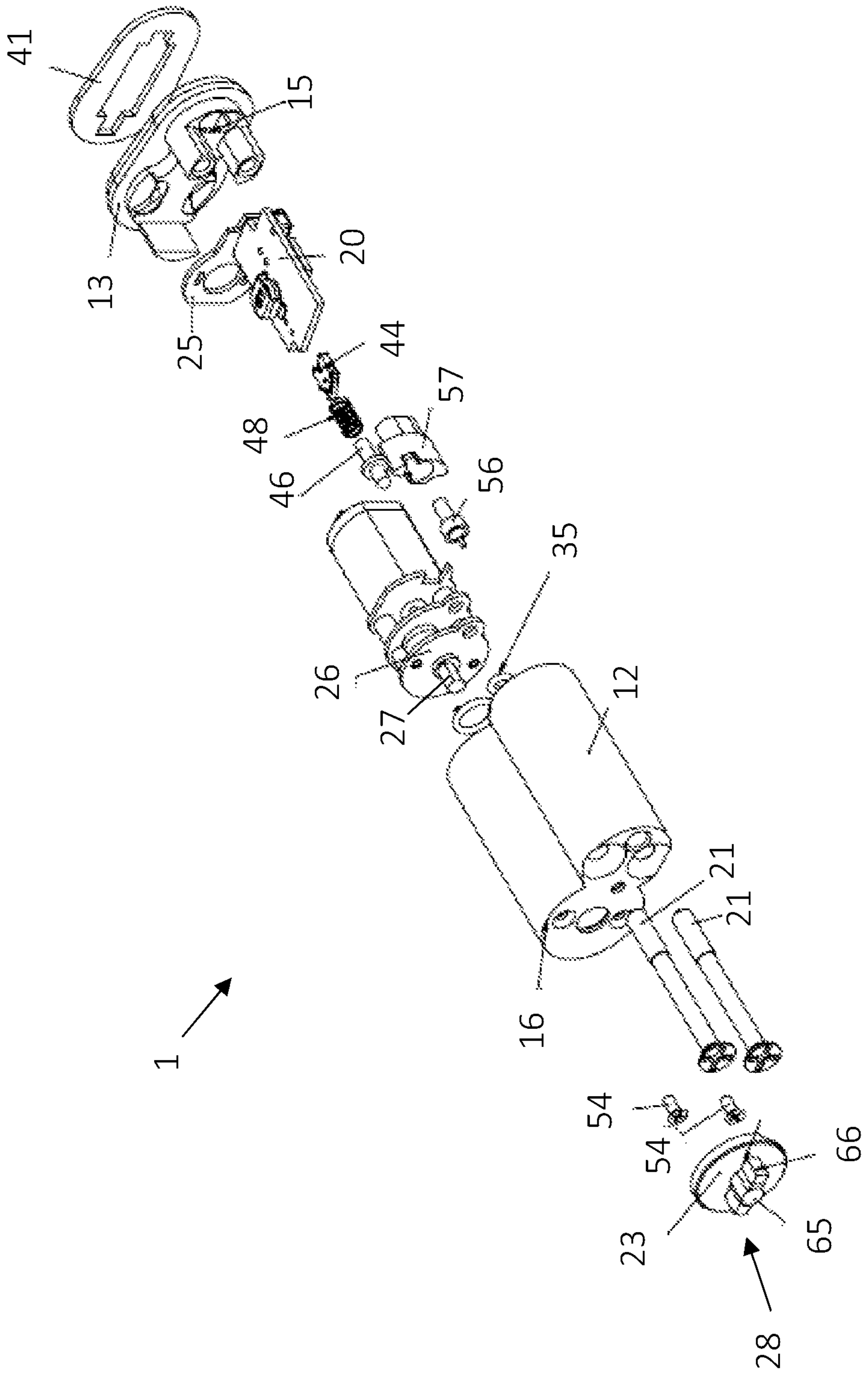
FIG. 14 is an exploded perspective view of a locking core according to another embodiment of the invention.
Figure 15:
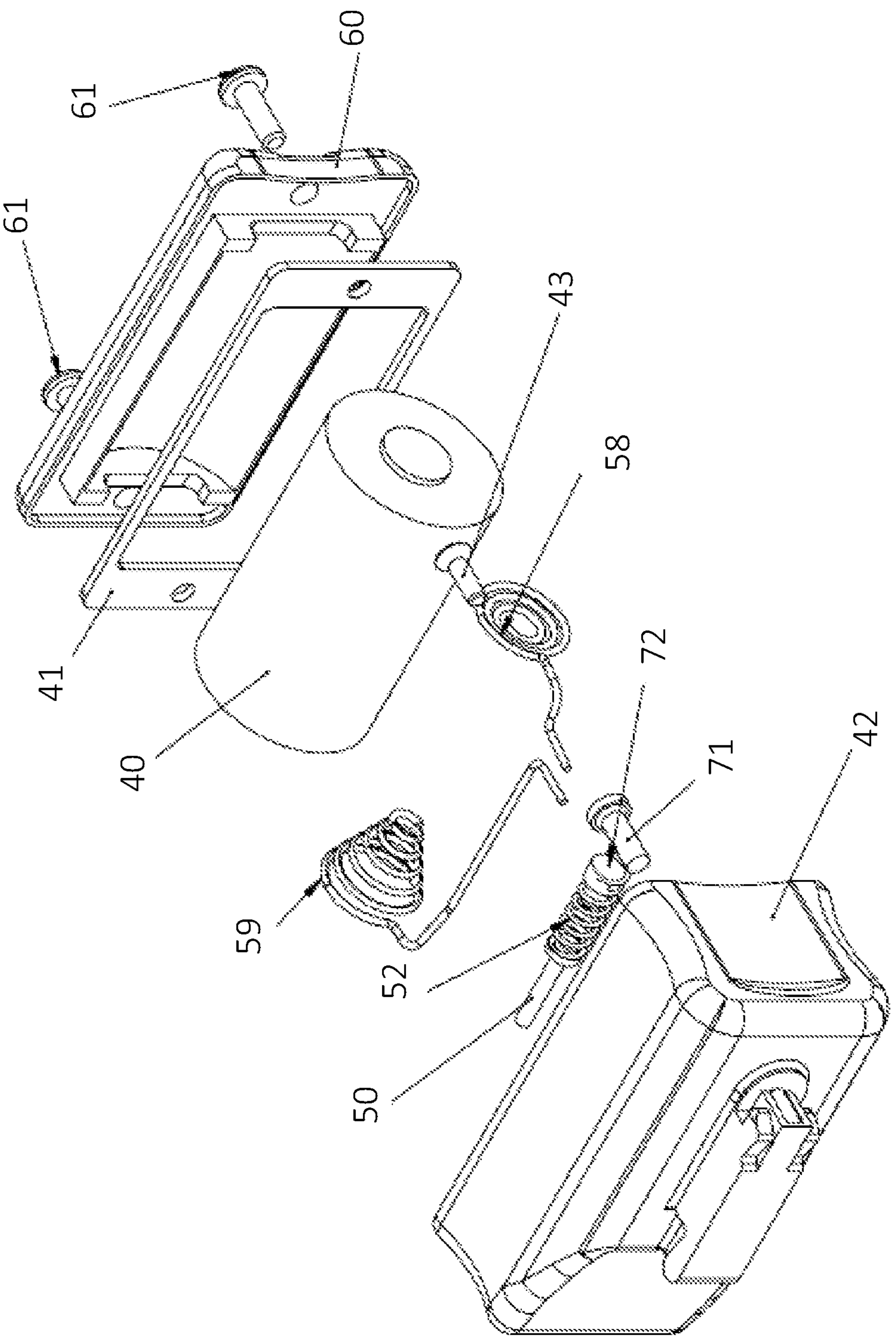
FIG. 15 is an exploded perspective view of a demountable power cartridge for powering the locking core shown in FIG. 14.
Figure 16C:
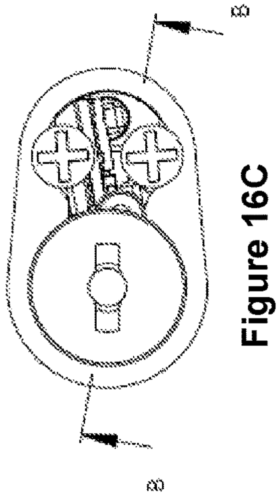
FIGS. 16A-16F are various views of the locking core of FIG. 14, including: a perspective view (FIG. 16A); a top view (FIG. 16B); a front view (FIG. 16C); a cross-sectional view along the line B-B in FIG. 16C (FIG. 16D); a side view (FIG. 16E); and a cross-sectional view along the line A-A (FIG. 16F).
Figure 16D:
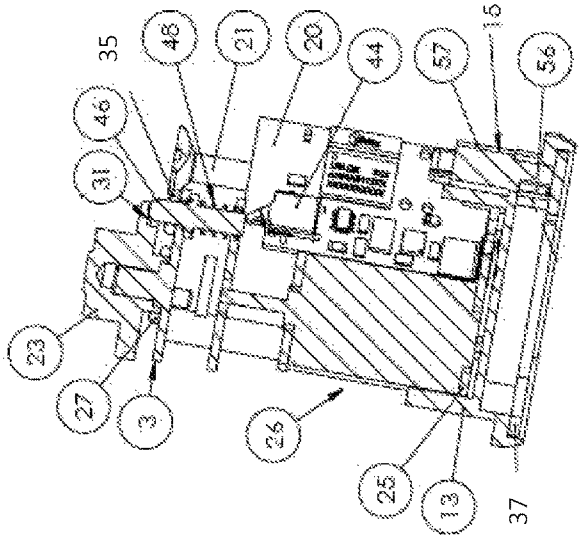
Figure 16A:
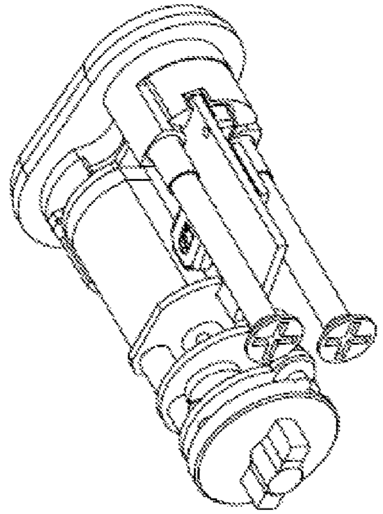
Figure 16B:
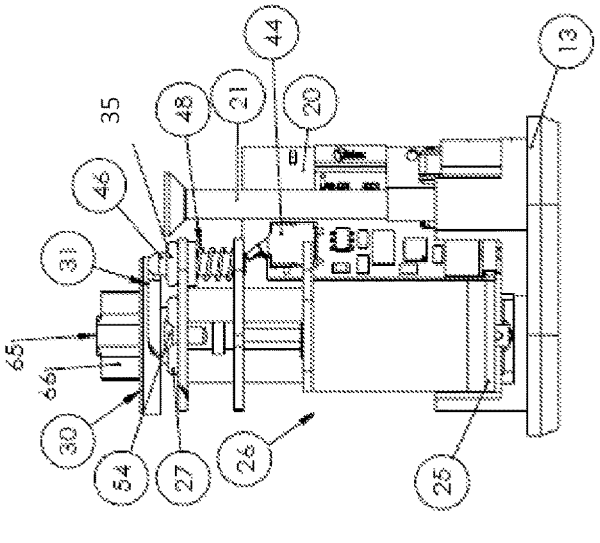
Figure 16F:
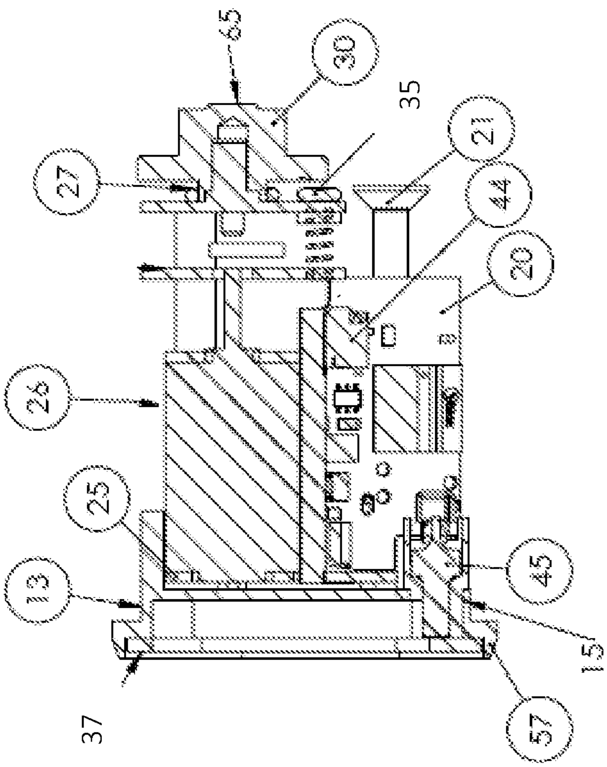
Figure 16E:
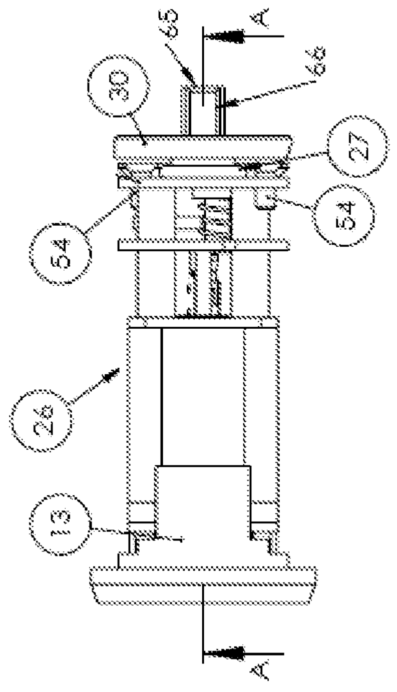

FIG. 13 illustrates a perspective view of the core (1) and cartridge (142) of FIG. 12, with the casing (12) and cartridge (142) illustrated in ghost-outline.

The casing closer (113) comprises a circular, threaded recess (117) for receiving the knuckle thread (164) of the cartridge (142). The threaded engagement reduces wear and tear on both the casing closer (113) and the knuckle thread (164) as the cartridge (142) is repeatedly connected and disconnected with the core (1).

Once the cartridge (142) is connected to the casing closer (113) an electrical connection is formed between the terminal (56) and the cooperating terminal (163) to power the electronic circuit board (20) and drive the motor (26) to unlock the latch (32).

FIGS. 14 and 16A-16F show a locking core (1) according to another embodiment of the invention. The locking core (1) of FIGS. 14 and 16A-16F comprises the same components, with like reference numbers, as described for the embodiment shown in FIG. 1.

The locking core (1) of FIGS. 14 and 16A-16F differs from the embodiment shown in FIG. 1 in the ways described below.

The motor (26) in the embodiment of FIG. 1 was arranged to rotate at a maximum speed of about 20,000 rpm. The motor (26) has a five-stage gearbox with a gear ratio of about 380:1.

In contrast, the drive motor (26) in the embodiment of FIGS. 14 and 16A-16F includes a seven-stage gear box and has a maximum rotational speed reduced from 20,000 rpm to about 10,000 rpm. The applicant has found that this saves battery life and reduces wear of the drive motor (26) when a starting in first gear. This can extend the life span of the locking core (1) from 3,000 open and close cycles to 5,000 cycles.

The use of a seven-stage gearbox enables the gear ratio to be increased by about 2½ times from 380:1 ratio to about 1000:1 ratio. This can further improve the open and close cycle rates. The applicant has found that the increased gear ratio results in the first gear having almost no loading (i.e. torque) from the drive motor (26) upon start-up. If a full load of the motor is applied instantly upon start-up, it can lead to damage of the locking core (1).

All the improvements described above can result in an improvement of cycle rates up to 120,000 open and close cycles.

In use, the locking core (1) in the embodiment of FIGS. 14 and 16A-16F protrudes slightly from lock body, which results in a more aesthetically appealing product that indicates a high level of durability to the consumer.

The locking core (1) has no interconnecting wiring requirements. All electrical componentry is located on the electronic circuit board (20) and the motor PC board (25) which are electrically connected.

The electronic circuit board (20) may include a real-time clock (RTC) that includes a miniature battery. This prevents users from compromising the validity period of their unique data code by endeavouring to alter the time on their mobile phone to match the validity period of their unique data code.

The locking core (1) may include a potting compound within the locking core itself to improve its weather resistance and waterproofing.

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the example methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

LEGEND

| NO. | NAME | NO. | NAME |
|---|---|---|---|
| 1 | LOCKING CORE | 35 | ‘O’-RING SEAL |
| 2 | PADLOCK - LOCK | 40 | POWER SOURCE - BATTERY |
| 3 | CORE RETAINING BORE | 41 | POWER SOURCE GASKET |
| 4 | CORE RECEIVING CAVITY | 42 | POWER CARTRIDGE |
| 5 | LOCKING BALLS | 43 | GASKET SCREW |
| 6 | CORE RETAINING SCREW | 44 | LIMIT SWITCH |
| 7 | LOCKING RECESS | 45 | BLADE |
| 8 | LOCKING RECESS OF BOLT | 46 | LIMIT SWITCH STRIKER |
| 9 | BOLT CAVITY | 47 | LIMIT SWITH ARM |
| 10 | ROTATIONAL BOLT | 48 | LIMIT SWITCH SPRING |
| 11 | RELEASE HOLE | 49 | LOCKING LIP |
| 12 | CASING | 50 | CARTRIDGE RETAINER |
| 13 | CASING CLOSER | 51 | MOUNTING LIP |
| 14 | ACCESSIBLE END | 52 | RETAINER TENSIONER |
| 15 | ACCESS OPENING | 53 | CARTRIDGE RETAINING SCREW |
| 16 | CONCEALED END | 54 | MOTOR RETAINING SCREWS |
| 17 | CARTRIDGE RECEIVING SLOT | 55 | BATTERY CAVITY |
| 18 | LOCK BODY | 56 | TERMINAL |
| 20 | ELECTONIC CIRCUIT BOARD | 57 | TERMIANL INSULATION |
| 21 | ECB RETAINING SCREWS | 58 | +VE BATTERY TERMINAL |
| 22 | REMOTE DATA SOURCE | 59 | _VE BATTERY TERMINAL |
| 23 | LOCKING MEMBER SURFACE | 60 | CARTRIDGE CAP |
| 24 | UNIQUE DATA CODE | 61 | CAP RETAINING SCREW |
| 25 | MOTOR PC BOARD | 62 | CAP TRHEAD |
| 26 | MOTOR | 63 | COOPERATING TERMINAL |
| 27 | MOTOR SPINDLE | 64 | KNUCKLE THREAD |
| 28 | LOCKING MEMBER | 65 | BOSS BODY |
| 29 | LOCKING MEMBER LIP | 66 | BOSS ARMS |
| 30 | DRIVE LUG/BOSS | 65 | BOSS BODY |
| 31 | LIP RECESS | 66 | BOSS ARMS |
| 32 | LATCH/SHACKLE | 68 | CENTRAL PORTION OF SLOT |
| 33 | SHACKLE HEEL | 69 | KEYED END OF SLOT |
| 34 | SHACKLE TOE | 70 | LOCK CYLINDER |
| 71 | SLOPING SURFACE OF RECESS | 160 | CARTRIDGE CAP |
| 113 | CASING CLOSER | 162 | THREAD |
| 117 | CIRCULAR THREADED RECESS | 163 | CO-OPERATING TERMINAL |
| 158 | FIRST TERMINAL | 164 | KNUCKLE THREAD |
| 159 | SECOND TERMINAL | | |

The invention claimed is:

1. A system for unlocking a lock comprising:

an electronic locking core for insertion in a lock body, and a separate power source;

wherein the locking core comprises:

a casing having an accessible end and an inaccessible end, when inserted into the lock body, an electronic circuit board housed within the casing for receiving electronic data from a remote device that is separate from the locking core and the separate power source, a motor housed within the casing, the electronic circuit board configured to activate on receipt of data containing a unique data code from the remote device and configured to drive the motor upon receipt of the unique data code from the remote device, wherein the motor is configured to move a locking member located at the inaccessible end of the casing and externally thereof that transitions a latch of the lock between a locked and an unlocked configuration; and a terminal located at the accessible end of the casing in electrical contact with the internal electronic circuit board to receive power from the separate power source, wherein the separate power source comprises at least one battery contained within a housing of a power cartridge separate from and connectable to the locking core, the power cartridge including a co-operating terminal at one end of the power cartridge housing configured to connect with the terminal at the accessible end of the locking core casing to allow power from the separate power source to activate the electronic circuit board and motor within the casing, and wherein the power cartridge is external of the lock body when it is connected to the locking core within the lock body and the motor of the locking core is only activated to move the locking member to unlock the lock when the power cartridge is mechanically connected to the locking core casing such that the power source is electrically connected to the motor and the electronic circuit board receives the unique data code from the remote device.

2. The system of claim 1, wherein the power cartridge is mechanically connected to the locking core casing by way of at least one of a threaded arrangement, a snap-fit arrangement, or a push-fit arrangement.

3. The system of claim 1, wherein a waterproof shield is provided around the power cartridge housing of the power source to protect the battery.

4. The system of claim 1, wherein the unique data code is transmitted wirelessly to the locking core from the remote device.

5. The system of claim 4, wherein the remote device is a cellular telephone.

6. The system of claim 1, wherein the unique data code is transmitted to the locking core via a wired connection from the remote device.

7. The system of claim 1 further including a padlock having a body which is fitted with the electronic locking core.

8. The system of claim 1 further including a lock which is fitted with the electronic locking core.

9. The system of claim 1, wherein the motor has a limiter that limits rotation of the locking member to within an angular range.

10. The system of claim 9, wherein the limiter comprises a limit switch that is actuatable via mechanical interaction between a spring biased striker and a surface of the locking member provided with a recess.

11. The system of claim 10, wherein when the recess is rotationally aligned with the striker, the spring biases the striker to enter the recess which actuates the limit switch so as to break electrical contact at the motor, thereby stopping the motor.

12. The system of claim 10, wherein the recess is provided in a peripheral lip on the locking member.

13. The system of claim 10, wherein the surface of the locking member engageable by the striker is an indented cam surface.

14. The system of claim 1, wherein the locking member includes a boss that extends from the locking member to engage and drive a rotational bolt or bar of the lock.

15. The system of claim 1, wherein the motor is arranged to rotate at a rotation speed that is not greater than about 10,000 rpm.

16. The system of claim 1, wherein the motor includes a gearbox having at least five gears.

17. The system of claim 1, wherein the motor has a gear ratio of at least 380:1.

18. A method of using the system of claim 1, the method comprising the steps of:

connecting the separate power source to the locking core to activate the electronic circuit board and motor within the locking core;

locating a remote device in a predetermined operational zone of the electronic locking core; and activating the remote device to transmit a unique data code to the electronic circuit board, wherein the circuit board draws power from the power source and on accepting the unique data code activates the motor to drive the locking member of the locking core to release a latch of the lock.

19. The system of claim 1, wherein the motor includes a gearbox having at least seven gears.

20. The system of claim 1, wherein the motor has a gear ratio about 1000:1.

* * * * *